(12) United States Patent
Tenenbaum et al.

(10) Patent No.: US 8,714,841 B2
(45) Date of Patent: May 6, 2014

(54) CAMERA POD

(75) Inventors: David M. Tenenbaum, Hingham, MA (US); Richard Hardy, Henderson, NV (US); Jonathan Hardy, Normandy Park, WA (US); Leo Fridley, Seattle, WA (US); Joshua Hardy, Normandy Park, WA (US)

(73) Assignee: Airborne Sensor LLC, Auburn, WA (US)

( * ) Notice: Subject to any disclaimer, the term of this patent is extended or adjusted under 35 U.S.C. 154(b) by 0 days.

(21) Appl. No.: 13/385,640

(22) Filed: Feb. 28, 2012

(65) Prior Publication Data

US 2013/0223833 A1 Aug. 29, 2013

(51) Int. Cl.
*F16M 11/04* (2006.01)
*G03B 17/56* (2006.01)
*F16M 13/00* (2006.01)
*F16M 11/10* (2006.01)

(52) U.S. Cl.
CPC ............. *F16M 11/04* (2013.01); *G03B 17/56* (2013.01); *F16M 13/00* (2013.01); *F16M 11/041* (2013.01); *F16M 11/10* (2013.01)
USPC ........................................................ 396/419

(58) Field of Classification Search
CPC .............................. G01C 21/18; F16M 11/04
USPC ................................................ 396/12, 419, 7
See application file for complete search history.

(56) References Cited

U.S. PATENT DOCUMENTS

| | | | | |
|---|---|---|---|---|
| 1,735,109 A * | 11/1929 | Eliel | .................................. | 396/9 |
| 3,638,502 A * | 2/1972 | Leavitt et al. | .................. | 74/5.34 |
| 3,689,012 A * | 9/1972 | Balmer | ...................... | 244/118.1 |
| 3,917,199 A * | 11/1975 | Dewitt | ............................ | 396/13 |
| 4,080,629 A * | 3/1978 | Hammond et al. | ........... | 348/373 |
| 4,218,702 A | 8/1980 | Brocard et al. | | |
| 4,736,218 A * | 4/1988 | Kutman | ........................ | 396/427 |
| 4,945,367 A * | 7/1990 | Blackshear | .................. | 396/427 |
| 5,426,476 A | 6/1995 | Fussell et al. | | |
| 5,531,403 A | 7/1996 | Tyler | | |
| 6,422,508 B1 | 7/2002 | Barnes | | |
| 7,463,280 B2 * | 12/2008 | Steuart, III | ...................... | 348/36 |
| 7,491,002 B2 | 2/2009 | Mulvey et al. | | |
| 2002/0067424 A1 | 6/2002 | Brunner, Jr. | | |
| 2004/0155959 A1 | 8/2004 | Cullens | | |
| 2004/0257441 A1 * | 12/2004 | Pevear et al. | .................. | 348/144 |

OTHER PUBLICATIONS

"Motocam" shock box camera system available from Aircraft Spruce & Specialty Co. (www.aircraftspruce.com) (two (2) pages).

* cited by examiner

*Primary Examiner* — Clayton E Laballe
*Assistant Examiner* — Kevin Butler
(74) *Attorney, Agent, or Firm* — Iandiorio Teska & Coleman LLP (57) ABSTRACT

A camera pod for an aircraft includes a housing with a plurality of camera compartments configured to downwardly angle a camera therein and a port for the lens of a camera. A pliant member is configured to quickly and easily retain a camera in a compartment biasing the camera in the downwardly angled position and absorbing vibration. A back plate is secured to the housing sealing it.

27 Claims, 13 Drawing Sheets

CAMERA POD

FIELD OF THE INVENTION

The invention relates to camera mounts and housings.

BACKGROUND OF THE INVENTION

Adventuresome individuals sometimes purchase small video cameras, attach them to a means of conveyance, or a helmet or article of clothing, and record their travels, stunts, and adventures.

In but one example, the small 42 mm×60 mm×30 mm fairly inexpensive "HD Hero" camera can be purchased with various mounts tailored to attach the camera to handle bars, a chest harness, a roll bar, and the like.

Cameras and the usually expensive mounts for them are also known for aircraft. See, for example, published patent applications No. 2004/0155959 and 2002/0067424 and U.S. Pat. Nos. 6,422,508; 5,531,403; 4,218,702; the "Motocam" shock box camera system available from Aircraft Spruce & Specialty Co. (www.aircraftspruce.com), all of which are incorporated herein by this reference.

Pilots of various aircraft do not always use safe, FAA approved camera mounts. Instead, some pilots are using suction cup mounts, tape, and the like in order to mount video cameras like the "HD Hero" camera to the exterior of their aircraft. Such methods may not be safe and may violate FAA regulations.

SUMMARY OF THE INVENTION

This invention, in one particular example, results in a safer, less expensive video camera mount likely to be approved by the FAA. The regulations of 14 CFR 23.23-36.9(a) are included herein by this reference.

The subject invention, however, in other embodiments, need not achieve all these objectives and the claims hereof should not be limited to structures or methods capable of achieving these objectives.

The invention features a camera pod comprising, in one example, a housing including a plurality of camera compartments configured to downwardly angle a camera therein and having a port for the lens of a camera. A pliant member is configured to retain a camera in a compartment biasing the camera in the downwardly angled position and absorbing vibration. A back plate is secured to the housing sealing it.

The camera pod housing may have a round side wall with ports therein. In one version, the housing has a circular bottom wall. Typically the housing includes intersecting ribs defining camera compartments and, possibly, additional compartments. In one preferred embodiment, the camera compartments include an outer inwardly angled wall with a port. The inwardly angled wall is typically angled at 5-60° from vertical. The inwardly angled wall preferably includes a channel with a flat wall on each side thereof. The inwardly angled wall may include a channel with a flat wall on each side thereof.

A curved lens may be provided for the lens port. There may be one or more ports between adjacent compartments. Further included can be a vent hole in the housing. Typically, the housing is made of a material including nylon.

One pliant member includes a piece of foam wedged between a camera and a wall of a compartment. Typically, the piece of foam includes an angled front wall. Another pliant member includes a sheet bent into opposing biased apart members wedging a camera against a wall of a compartment. There may be a plurality of different size pliant members for different size cameras.

In one example, fasteners releasably secure the back plate to the housing. Quick connect fasteners can be used. For example, housing includes a recess for the fasteners designed such that the fastener is visible when not tightened and not visible when tightened.

Also, the housing in one preferred version includes spaced interior sockets and the back plate then includes spaced interior posts received in the sockets. The back plate may also include a rim surrounding the housing. A gasket is between the housing and the back plate. The camera pod may further require a doubler secured to the back plate (and the aircraft).

One camera pod housing includes a round side wall with ports therein and intersecting ribs connected to the round side wall defining camera compartments each including an outer inwardly angled wall with a port and configured to downwardly angle a camera therein. A pliant member is wedged between a camera and an outer compartment wall retaining the camera in its compartment and biasing the camera in a downwardly angled position. A back plate is releaseably attached to the housing.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
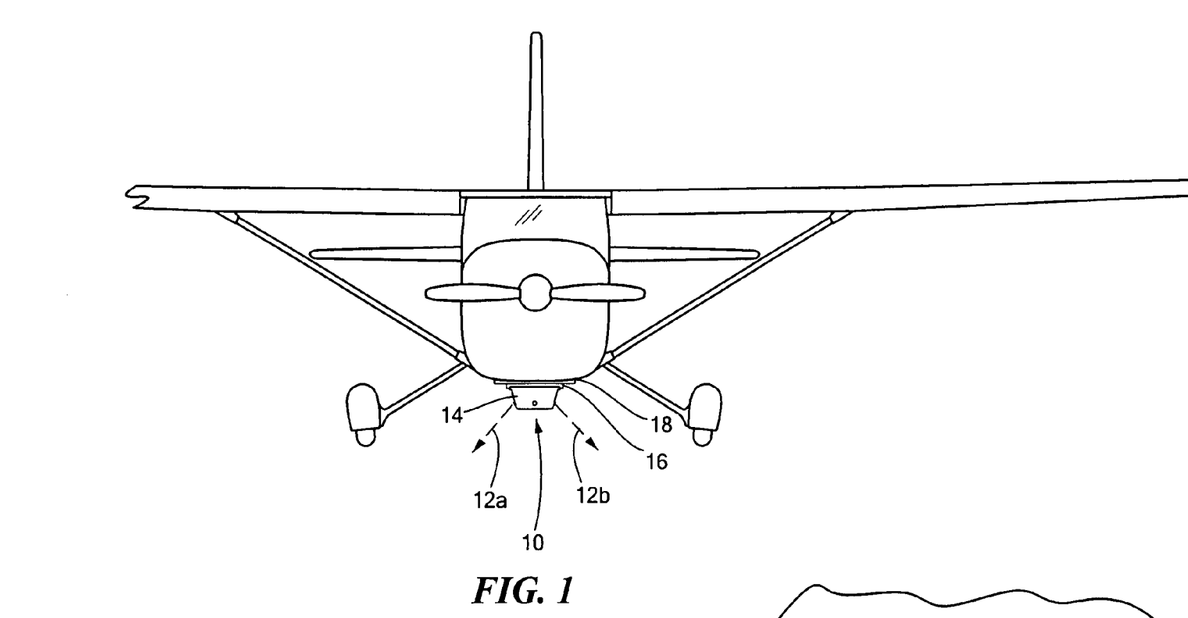
FIG. 1 is a schematic front view showing a camera pod mounted to the underside of an aircraft belly in accordance with an example of the invention.
Figure 2:
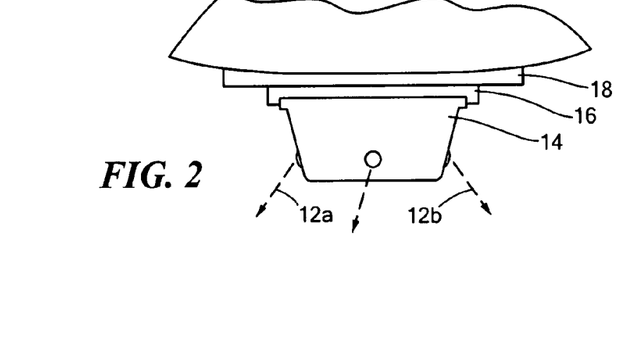
FIG. 2 is a schematic front view of the pod of FIG. 1 showing in more detail of the various components thereof.

FIGS. 1-2 depict, in accordance with one version of the invention, low profile camera pod 10 configured to house one or more cameras (e.g., a forward camera, a rearward camera, and two opposing side cameras), typically the "HD Hero" video camera referred to above, and orient them in a downwardly angled configuration as shown by arrows 12a and 12b in FIG. 1. In this particular example, pod 10 includes housing 14, mounting or back plate 16, secured to housing 14 and larger doubler 18 which may either be secured on one face to back plate 16 and on its opposite face to the underside of the aircraft, or the doubler may be situated inside the aircraft skin opposite the mounting plate 20. Rivets or the like may be used.

Figure 3:
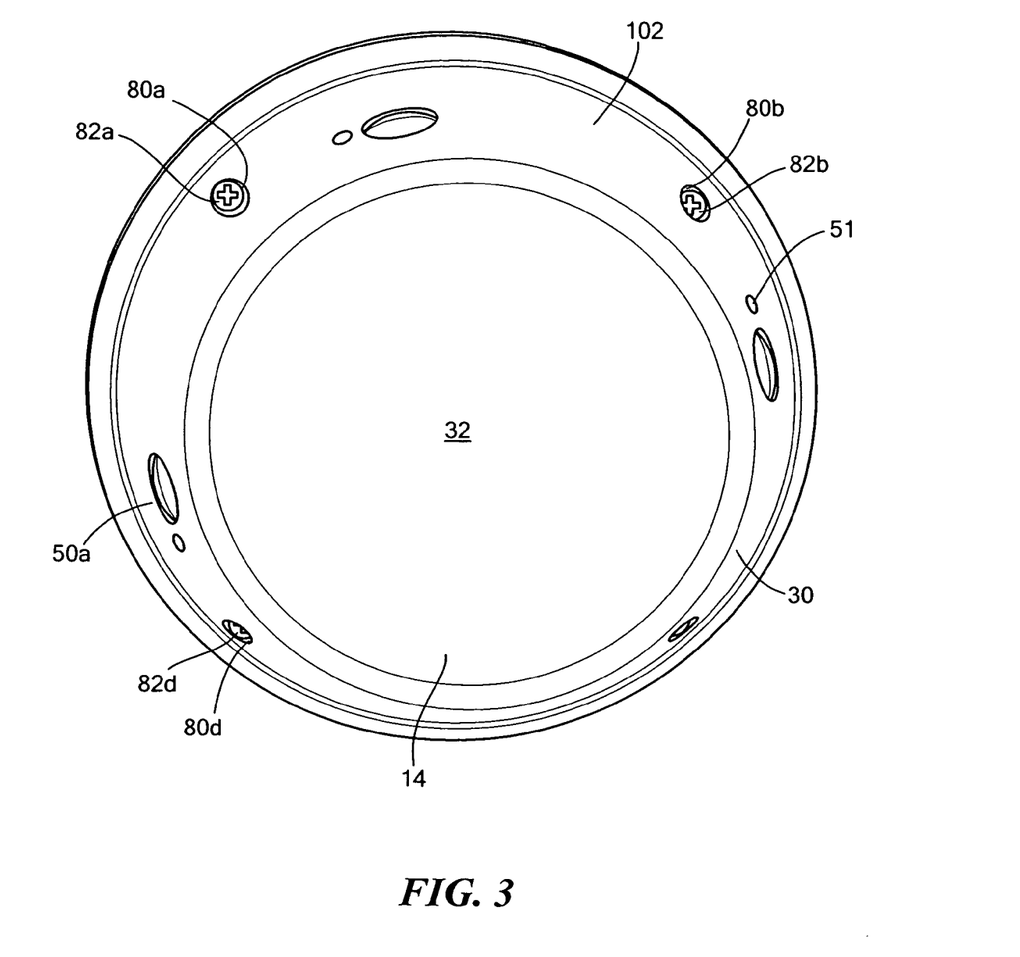
FIG. 3 is a schematic three dimensional view of the bottom of the housing portion of the pod shown in FIGS. 1 and 2.
Figure 4A:
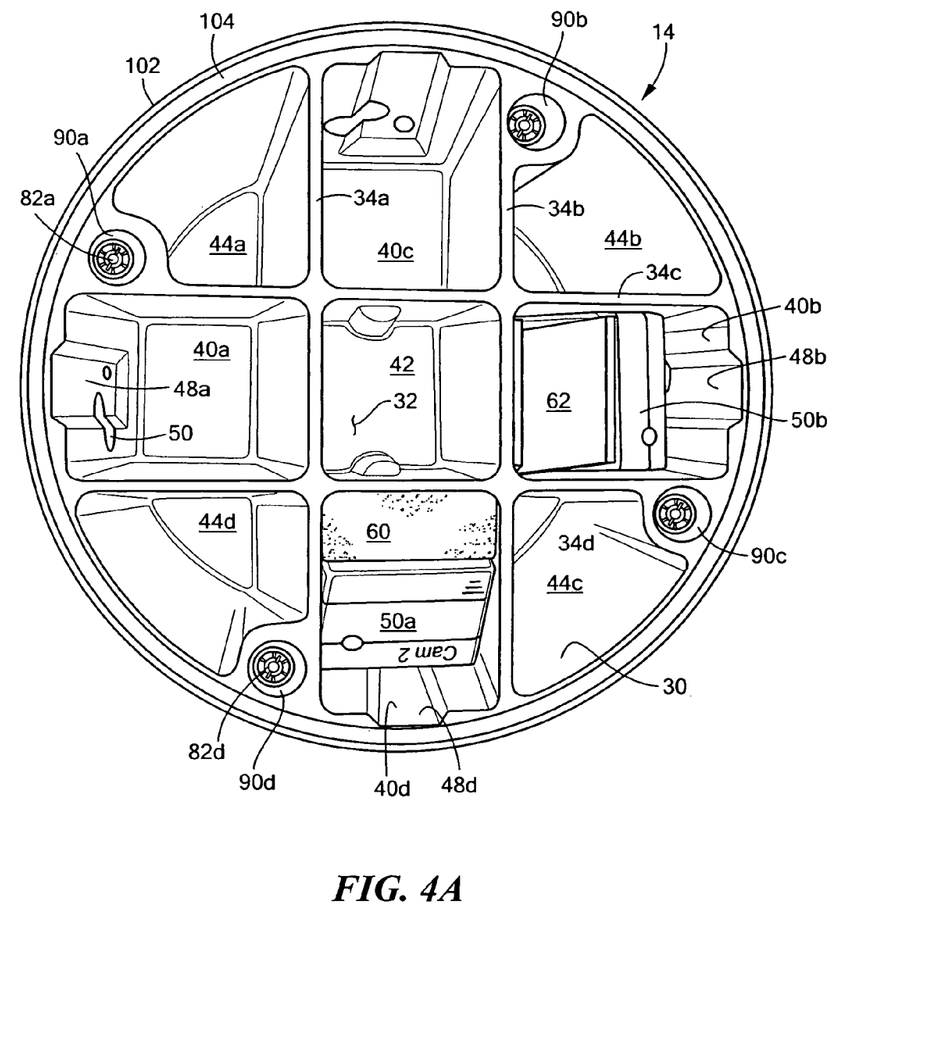
FIGS. 4A and 4B are schematic showing the interior of the housing of FIG. 3.
Figure 4B:
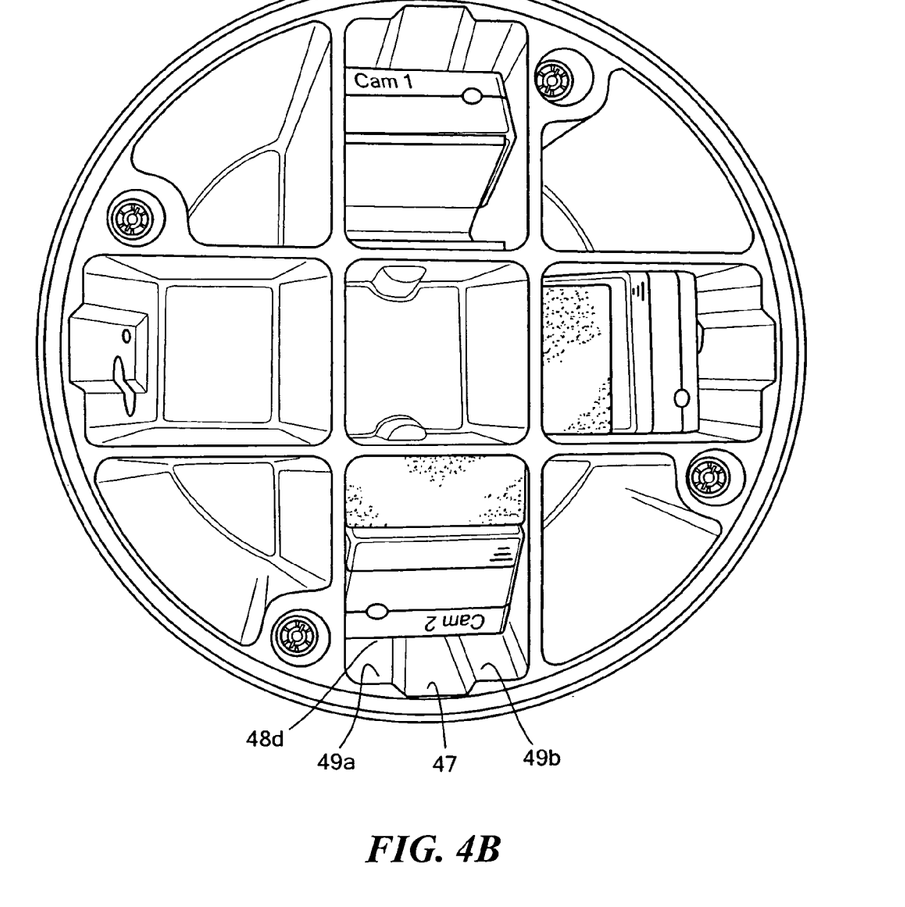

As shown in FIGS. 3-4, housing 14, in one example, includes a round side wall 30, circular bottom wall 32, and intersecting ribs 34a, 34b, 34c, and 34d defining camera compartments 40a, 40b, 40c, and 40d as well as interior compartment 42 and corner compartments 44a, 44b, 44c, and 44d.

Preferably, round sidewall 30 is angled inwardly from lip 102 to bottom wall 32 and thus defines outward compartment walls 48a-48d of camera compartments 40a-40d, respectively. The front of a camera such as cameras 50a and 50b (in compartment 40d and 40b) rests against these inwardly angled compartment outer walls (or portions thereof) and thus the cameras and their lenses are angled downwardly (typically between 5°-60°, e.g. 29°) to better video the terrain over which the aircraft is flying. In this way, a video log of the aircraft's flight path can be automatically made. And, the user has a choice of one or more cameras and a choice of mounting positions—right, left, front, and/or rear (usually for parachute operations). The bottom wall or middle compartment 42 may also have a lens.

The lens of the camera is received in a port in the compartment outer wall covered with a curved lens as shown at 50 in FIG. 4A for camera compartment 40a. FIG. 3 also shows additional camera compartment port 51 positioned, for example, adjacent to the camera indicator lamp so it can be seen from outside the pod. There may also be ports (not shown) between adjacent compartments for vapor escape, for moisture escape, or for vapor equalization, and/or for routing cables and the like and there may be one or more vent holes in housing 14 to allow moisture or vapor to escape. Housing 14 is preferably made of nylon, for example glass reinforced nylon. The round housing shape reduces weight and the compartment design provides strong load paths while also reducing weight.

Figure 5:
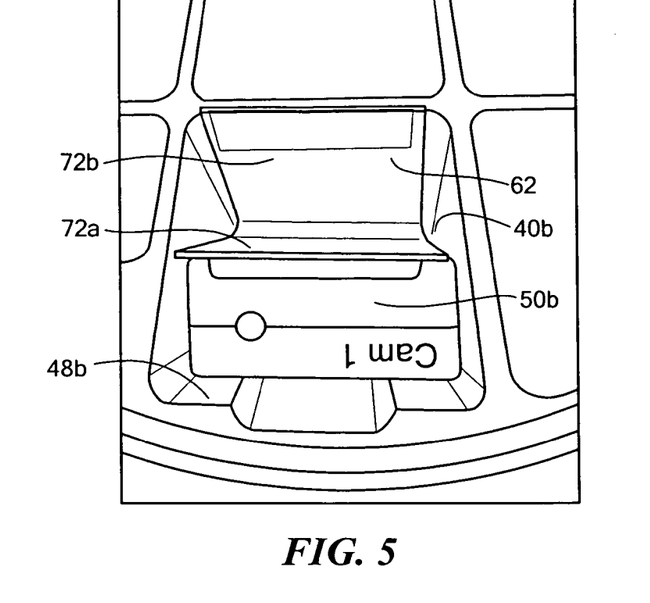
FIG. 5 is a schematic top view showing one example of a camera compartment and retaining member in accordance with an example of the invention.
Figure 6:
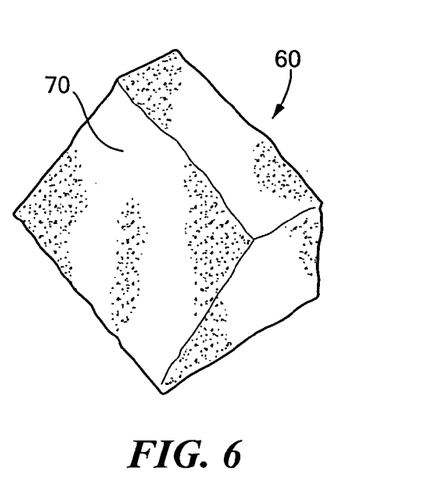
FIG. 6 is a schematic three dimensional top view of another example of a retaining member in accordance with the invention.
Figure 7:
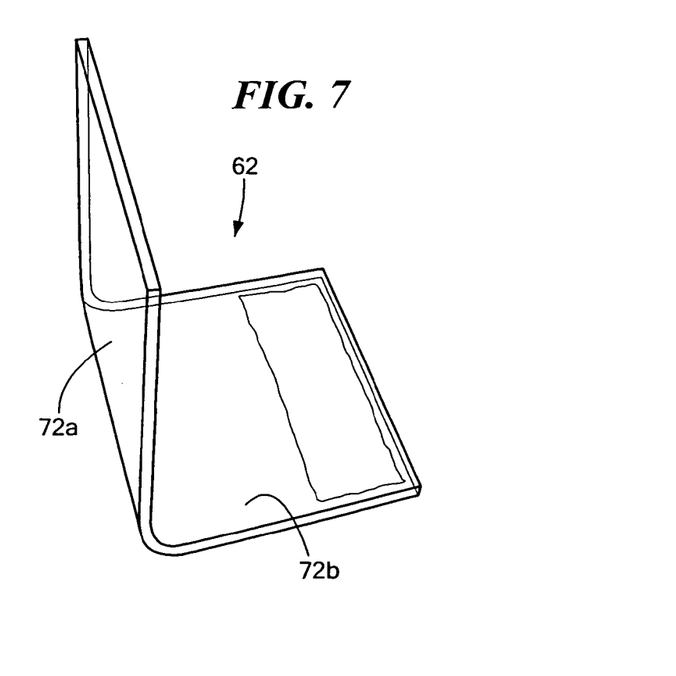
FIG. 7 is a schematic three dimensional side view of the retaining member of FIG. 5.

To retain each camera in its compartment and biased in the downwardly angled position, foam block 60 and/or bent plastic (e.g., lexan), sheet 62 is provided, FIGS. 4-7. These retainers also preferably absorb vibrations for a clearer video capture. Foam body 60, FIG. 6 includes angled front wall 70 for wedging foam body 60 between the rear of the camera and a rear compartment wall as shown in FIG. 4A. Bent sheet 62 includes opposing biased apart members 72a and 72b also designed to be wedged between the back of a camera and a rear compartment wall as shown in FIG. 5.

Figure 8:
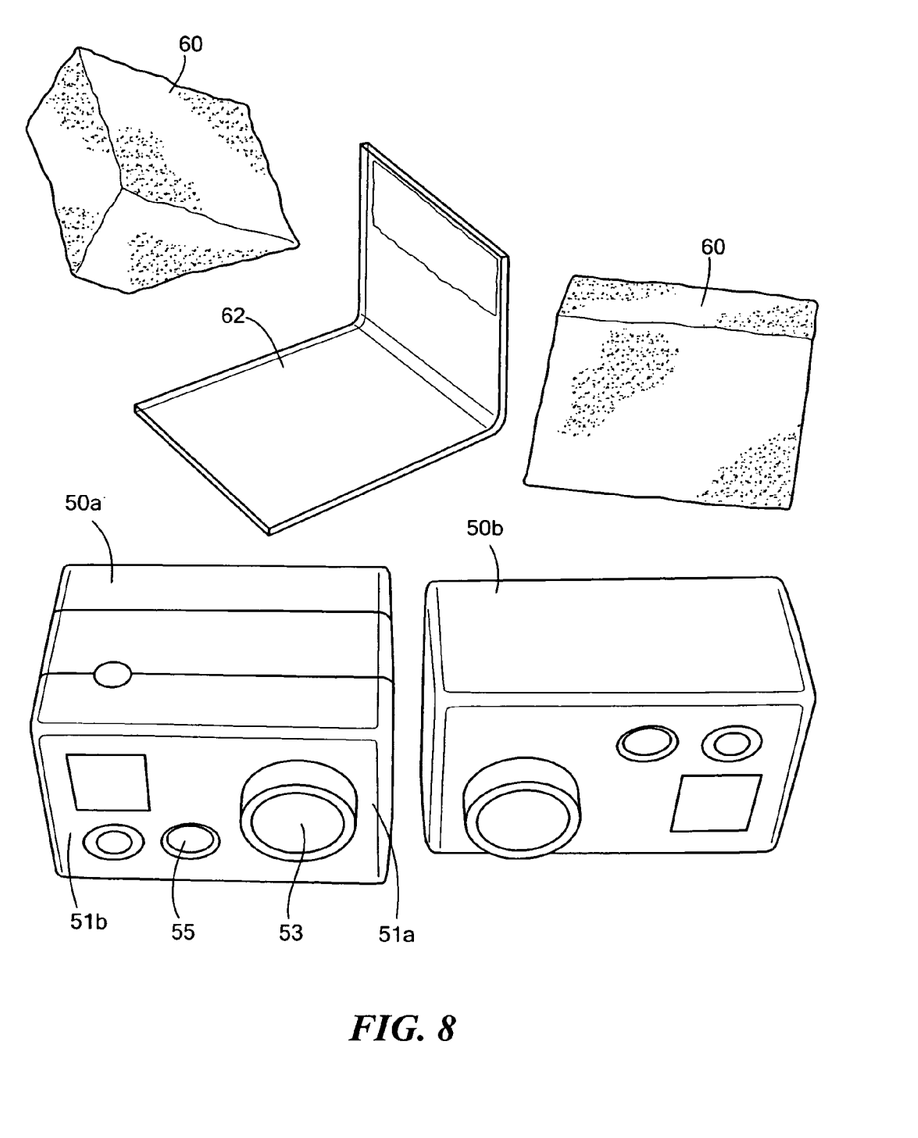
FIG. 8 is a three dimensional front view showing two different size cameras and a variety of different sized retaining members in accordance with the invention.

Other retaining means are possible and the size of the retainers may vary depending on the thickness of the camera. For example, FIG. 8 shows a thicker camera (with an attached battery pack) and thinner camera 50b and a plurality of different size retainers 60, 62. It is preferred that the cameras are easy to quickly load in and be removed from their respective compartments.

FIG. 4B in particular shows in more detail for a given camera compartment how outer compartment wall 48d includes flat inwardly angled sides 49a and 49b and on opposite sides middle channel 47 which provides clearance for the lens and indicator lamp of the camera. For example, flat inwardly angled side wall portion 49b supports camera wall 51b, FIG. 8, and flat inwardly angled compartment front wall 49a, FIG. 4B, supports camera front wall 51a FIG. 8. Recessed channel 47, FIG. 4B receives camera lens assembly 53, FIG. 8 and indicator lamp 55.

Figure 9:
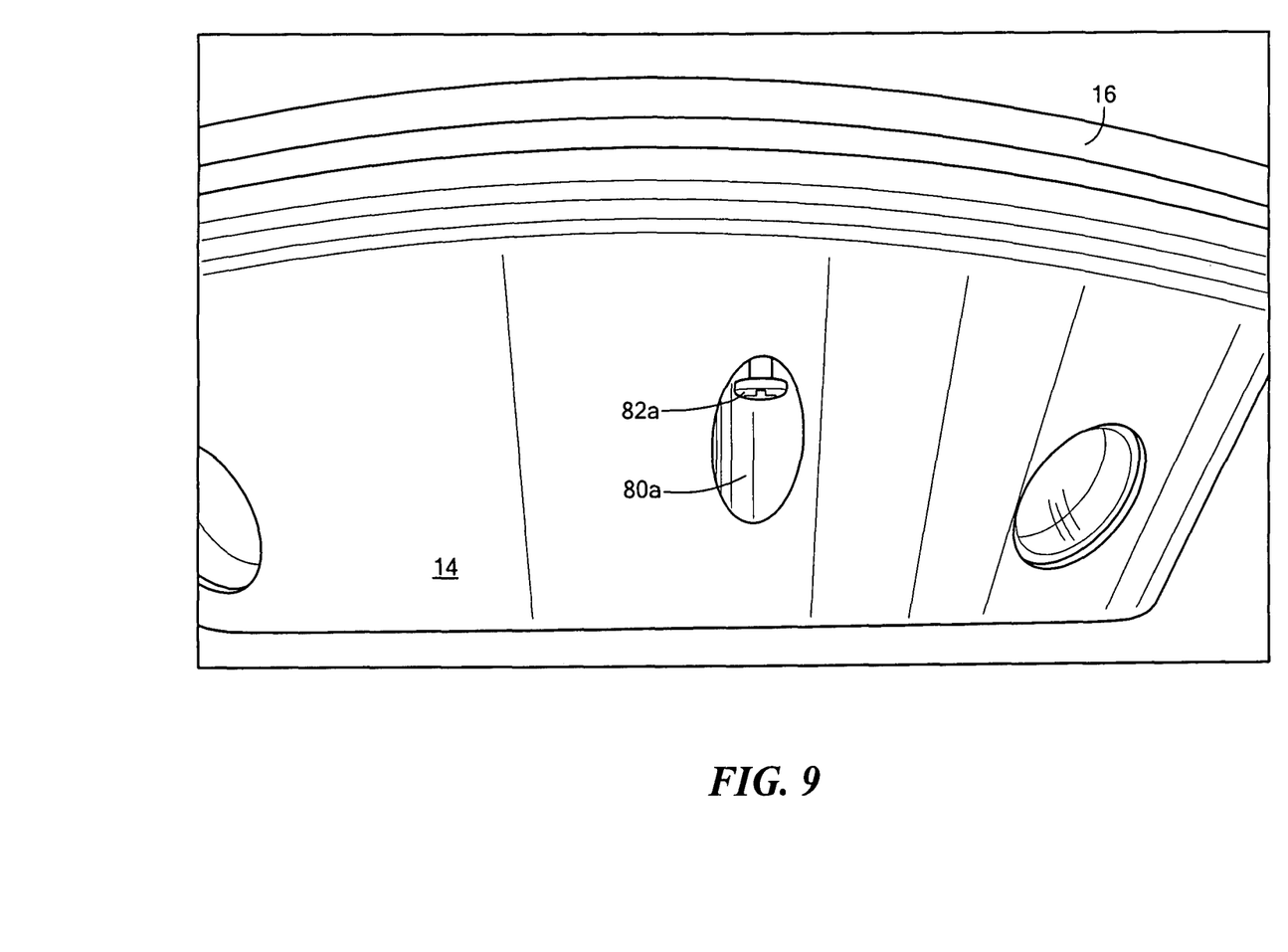
FIG. 9 is a schematic three dimensional side view showing the housing member coupled to the pod back plate.
Figure 10:
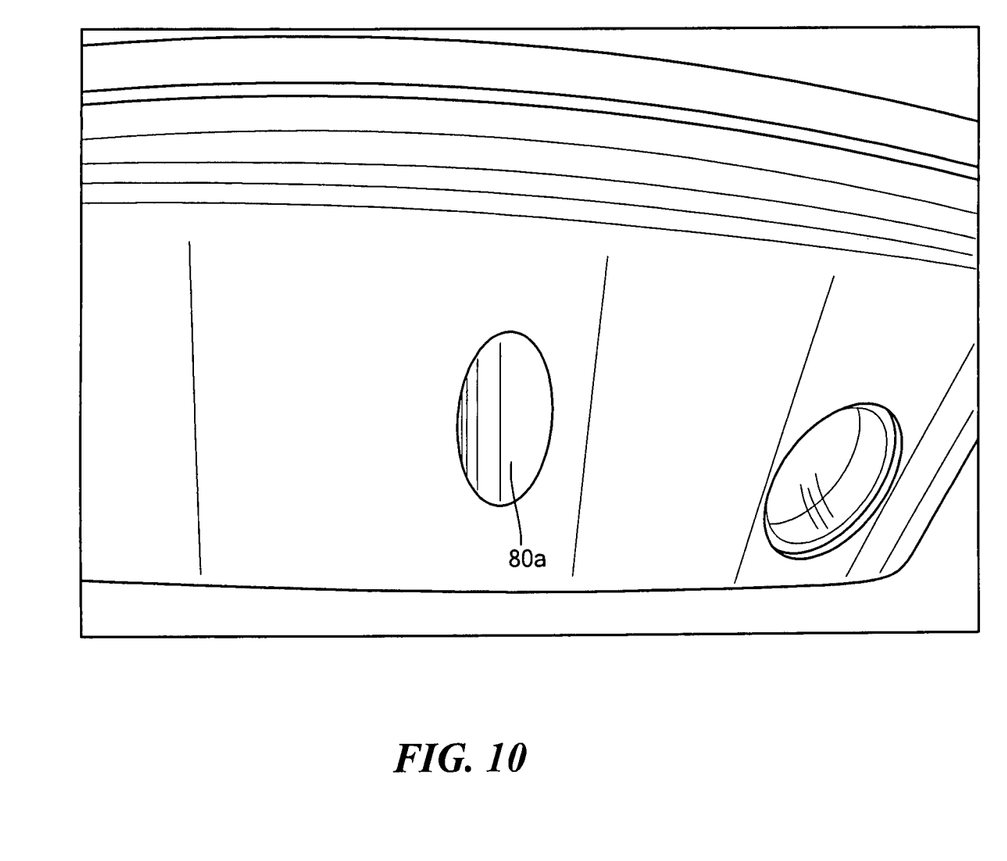
FIG. 10 is another schematic side view of the housing secured to the back plate.

Fasteners such as quick release fasteners are typically used to secure housing 14, FIG. 9 to aluminum to back plate 16. FIGS. 9-10 Show how housing 14 includes a recess 80a for each quick release fastener 82a configured such that the head of the fastener is visible when not tightened (FIG. 9) but cannot be seen (FIG. 10) when tightened. Thus, the user can readily ascertain by a quick visual inspection if the housing is secured to the back plate, ensuring the pod is mounted in a safe and airworthy manner.

Figure 11:
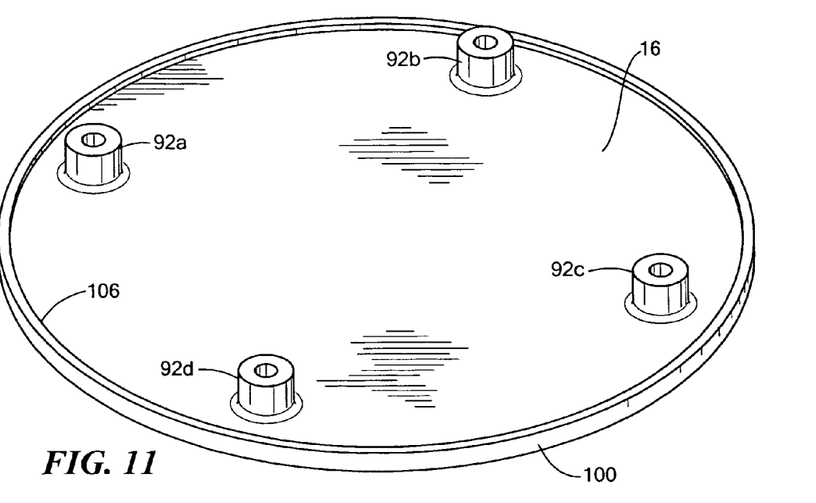
FIG. 11 is a schematic three dimensional view showing the interior of the back plate of FIGS. 9 and 10.

Preferably, housing 14, FIG. 4A includes spaced sockets 90a, 90b, 90c, and 90d through which the quick release fasteners extend and the interior of back plate 16, FIG. 11 includes corresponding spaced posts 92a-92d received in the housing sockets and each includes a feature therein which receives the distal operational end of one of the quick release fasteners.

In this way, the housing is easy to quickly attach to the typically permanently mounted back plate in a secure manner. The socket/post configuration in particular addresses shear forces experienced by the housing in flight. The housing is removed, a camera (or two or three or four) is turned on and loaded into the chosen compartment(s), the housing is then reattached. The posts and sockets make alignment simple. The flight then commences. After landing and taxiing to a ramp, the housing is detached and the camera(s) are retrieved.

In the example depicted so far, back plate 16, FIG. 11 includes rim 100 surrounding the lip (102, FIG. 3) of the housing and housing lip 102, FIG. 4A includes gasket 104 secured in depression 106 in the face of plate 16.

Figure 12:
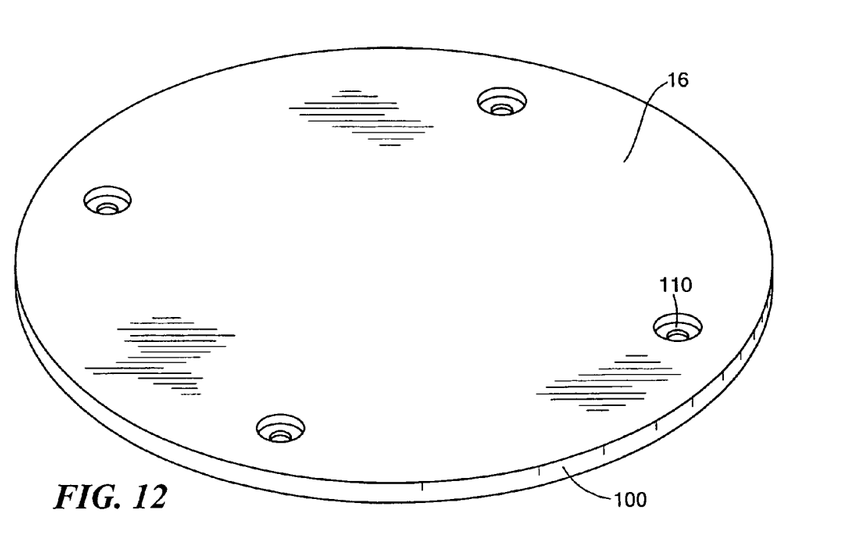
FIG. 12 is a schematic three dimensional showing the exterior of the back plate.
Figure 13:
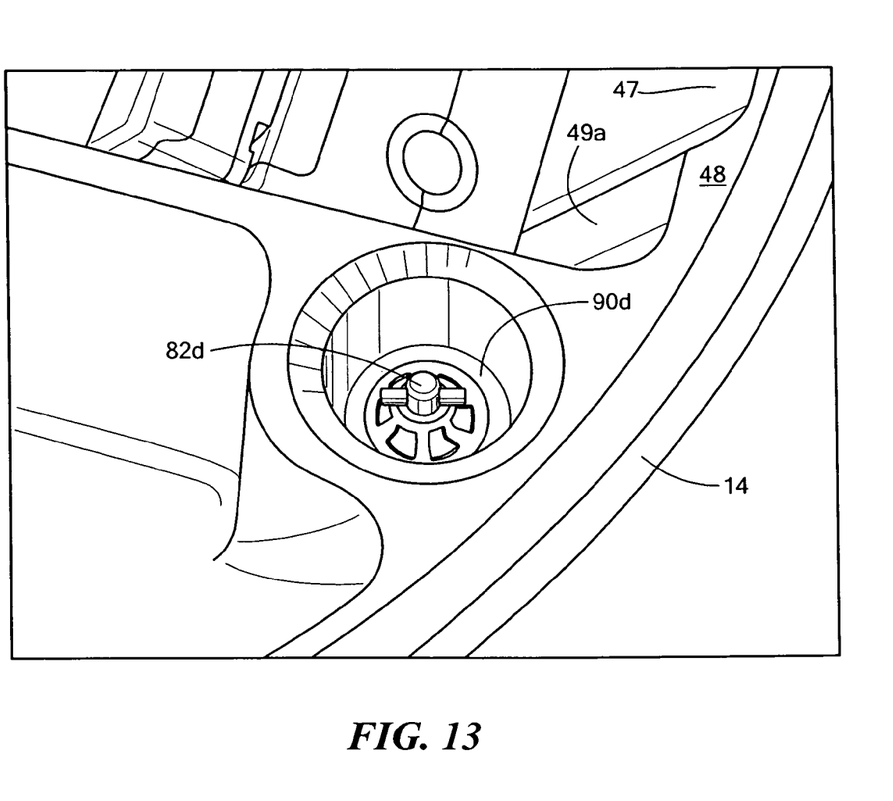
FIG. 13 is a schematic three dimensional showing in more detail a releasable fastener structure useful in accordance with the invention.
Figure 14:
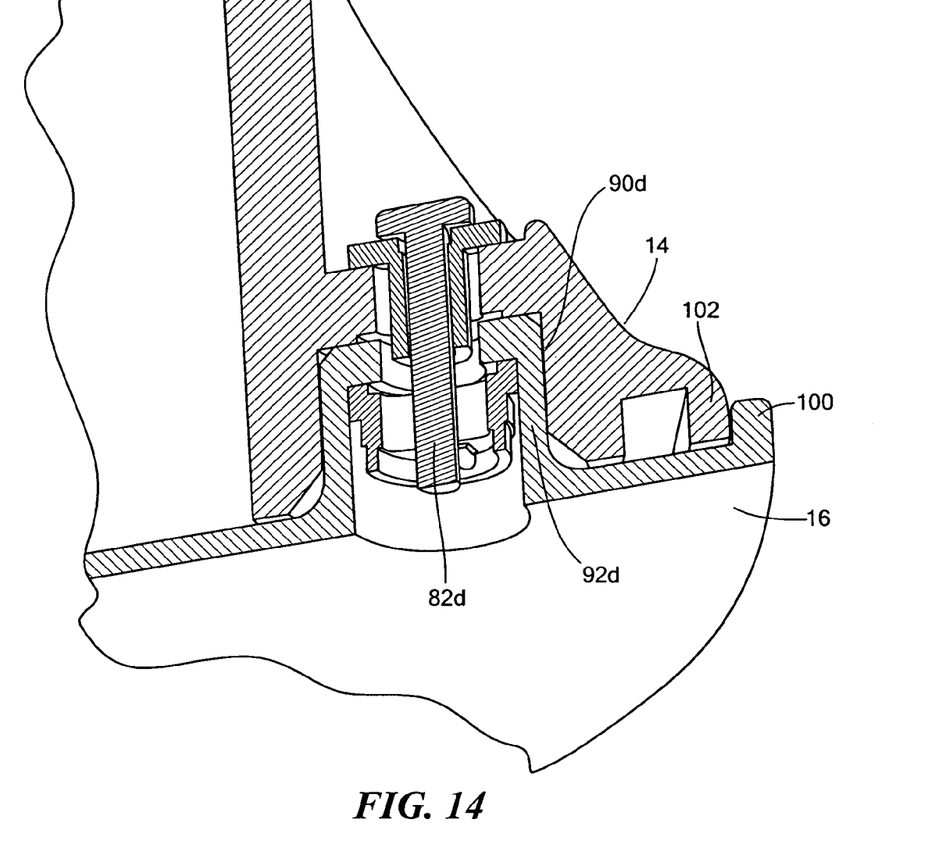
FIG. 14 is a schematic cross-sectional view of the releasable fastener of FIG. 13.

FIG. 12 shows the outside of plate 16 typically fastened (via rivets, for example) to a doubler itself permanently attached to the aircraft in a desired position (e.g. under the aircraft belly). The shouldered through holes shown at 110 receive the distal working ends of the quick release fasteners when the housing is secured to the back plate. FIGS. 13-14 show this detail in a clearer fashion where the distal operational end a of the quick release fastener is shown in socket 90d of housing 14 in and then extended up into the corresponding post feature associated with back plate 16 in FIG. 14.

Figure 15:
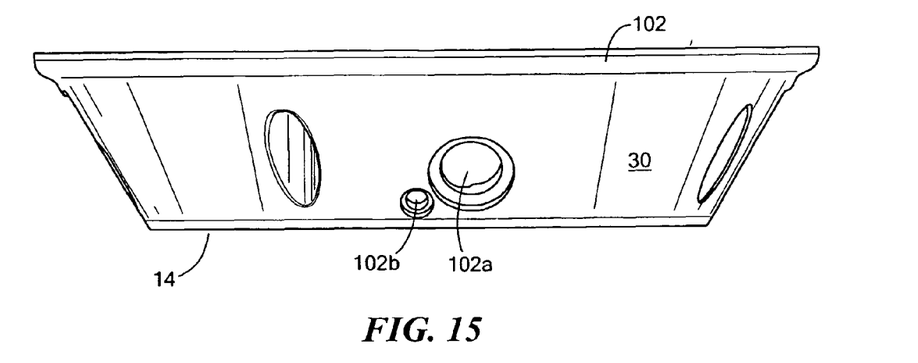
FIG. 15 is a schematic three dimensional side view of the housing portion of a camera pod in accordance with an example of the invention.
Figure 16:
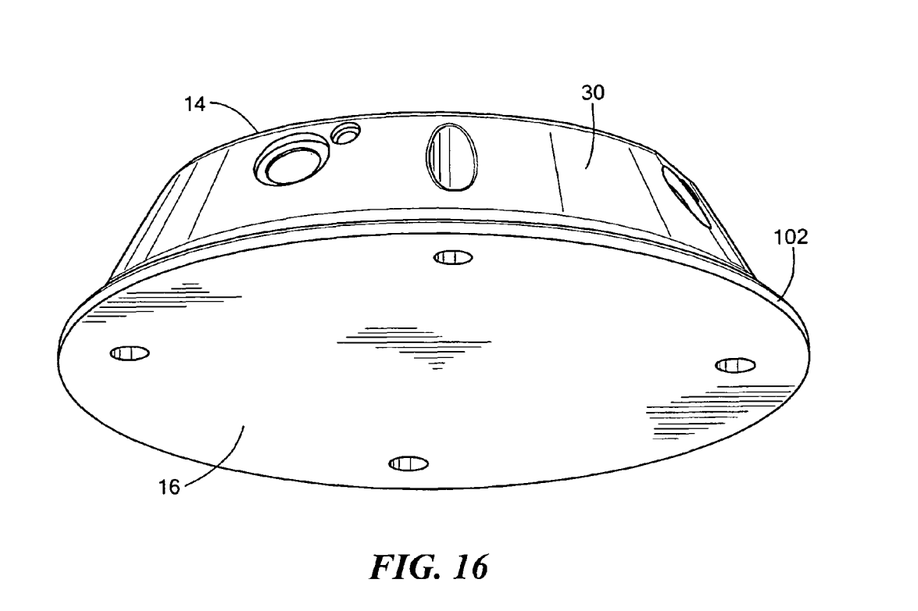
FIG. 16 is a schematic three dimensional bottom view of an example of a camera pod.

FIG. 15 shows ports 102a and 102b through peripheral wall 30 of housing 14 before their respective lenses are attached. Port 120*a* is specifically for the camera lens assembly and port 120*b* typically provides a way for the user to view one or more camera indicators. FIG. 16 shows the complete assembly with the back plate and the housing.

Figure 17:
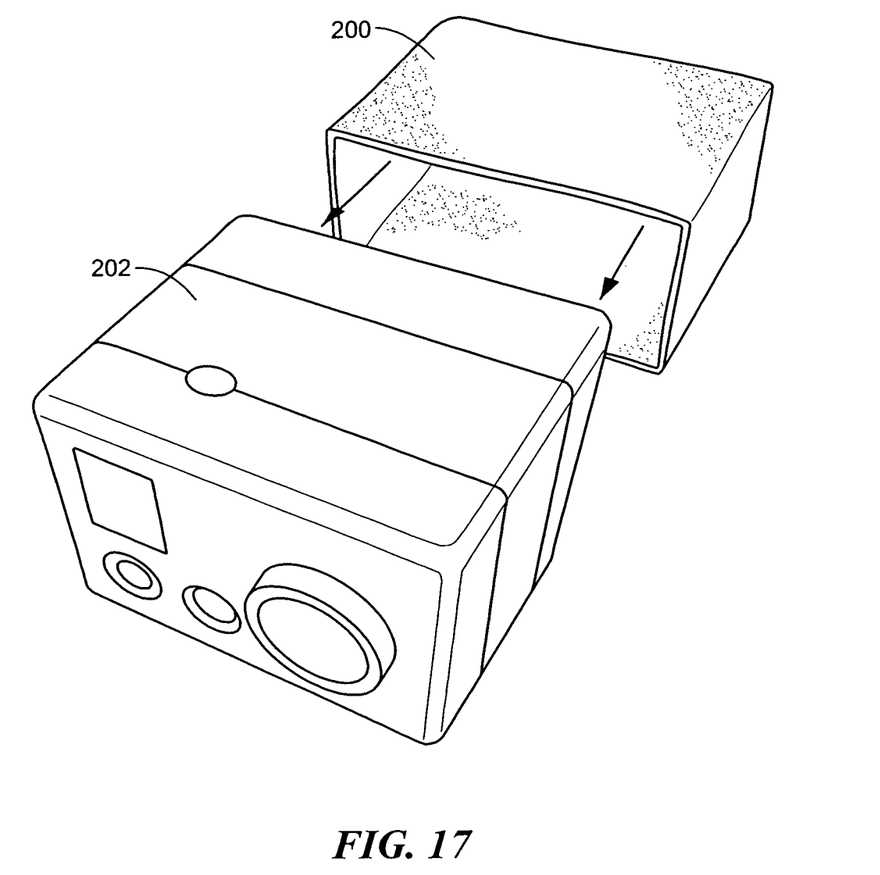
FIG. 17 shows a camera sleeve to insulate the camera battery in cold ambient conditions.

In one example, the housing is 10.2 inches in diameter and 2.2 inches deep. Each camera compartment is 2.5 inches wide by 2.5 inches long. At higher elevations and during winter months, the cameras in the housing can experience cold temperatures. Cold temperatures can impact camera battery life. At −30° C., for example, the recoding time may be as little as 0.5 hours. Accordingly, the invention also features an insulative case made of foam or neoprene, for example, for each camera. The case retains the heat generated by the camera and keeps the battery warmer. The five sided case may be disposed about the camera before it is placed in the housing. FIG. 17 shows sleeve 200 for camera 202.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A camera pod comprising:
a housing including intersecting ribs defining a plurality of camera compartments configured to downwardly angle a camera therein and having a port for the lens of a camera;
a pliant member including a piece of foam having an angled front wall, said pliant member wedged between a camera and a wall of a compartment, and configured to retain a camera in a said compartment biasing the camera in a downwardly angled position and absorbing vibration; and
a back plate secured to the housing sealing it.

2. The camera pod of claim 1 in which the housing has a round side wall with said ports therein.

3. The camera pod of claim 1 in which the housing has a circular bottom wall.

4. The camera pod of claim 1 in which said intersecting ribs further define additional compartments.

5. The camera pod of claim 1 in which the camera compartments include an outer inwardly angled wall with a said port.

6. The camera pod of claim 5 in which said inwardly angled wall is angled at 5-60° from vertical.

7. The camera pod of claim 5 in which the inwardly angled wall includes a channel with a flat wall on each side thereof.

8. The camera pod of claim 1 further including a lens for the lens port.

9. The camera pod of claim 1 further including one or more ports between adjacent compartments.

10. The camera pod of claim 1 further including vent holes in said housing.

11. The camera pod of claim 1 in which said housing is made of a material including nylon.

12. The camera pod of claim 1 in which a said pliant member includes a sheet bent into opposing biased apart members wedging a camera against a wall of a compartment.

13. The camera pod of claim 1 further including the plurality of different size pliant members for different size cameras.

14. The camera pod of claim 1 further including fasteners releasably securing the back plate to the housing.

15. The camera pod of claim 14 in which the fasteners include quick connect fasteners.

16. The camera pod of claim 15 in which the housing includes a recess for the fasteners designed such that the fastener is visible when not tightened and not visible when tightened.

17. The camera pod of claim 1 in which the housing includes spaced interior sockets and the back plate includes spaced interior posts received in said sockets.

18. The camera pod of claim 1 in which the back plate includes a rim surrounding said housing.

19. The camera pod of claim 1 further including a gasket between the housing and the back plate.

20. The camera pod of claim 1 further including a doubler secured to the back plate.

21. A camera pod comprising:
a housing including a plurality of camera compartments configured to downwardly angle a camera therein and having a port for the lens of a camera;
a plurality of different size pliant members configured to retain different size cameras in a said compartment biasing a camera in a downwardly angled position and absorbing vibration; and
a back plate secured to the housing sealing it.

22. A camera pod comprising:
a housing including spaced sockets and a plurality of camera compartments configured to downwardly angle a camera therein and having a port for the lens of a camera;
a pliant member configured to retain a camera in a said compartment biasing the camera in a downwardly angled position and absorbing vibration; and
a back plate with posts received in the housing sockets and secured to the housing sealing it.

23. A camera pod comprising:
a housing including intersecting ribs defining a plurality of camera compartments configured to downwardly angle a camera therein and having a port for the lens of a camera;
a pliant member configured to retain a camera in a said compartment biasing the camera in a downwardly angled position and absorbing vibration; and
a back plate releasably secured to the housing by quick connect fasteners for sealing said housing, the housing further including a recess for the fasteners designed such that the fasteners are visible when not tightened and not visible when tightened.

24. A camera pod comprising:
a housing including spaced interior sockets and intersecting ribs, said intersecting ribs defining a plurality of camera compartments configured to downwardly angle a camera therein and having a port for the lens of a camera;

a pliant member configured to retain a camera in a said compartment biasing the camera in a downwardly angled position and absorbing vibration; and a back plate including spaced interior posts received in said housing sockets, said back plate secured to the housing sealing it.

25. A camera pod comprising:

a housing including intersecting ribs defining a plurality of camera compartments configured to downwardly angle a camera therein and having a port for the lens of a camera;

a pliant member configured to retain a camera in a said compartment biasing the camera in a downwardly angled position and absorbing vibration; and a back plate including a rim surrounding the housing, the back plate secured to the housing sealing it.

26. A camera pod comprising:

a housing including intersecting ribs defining a plurality of camera compartments configured to downwardly angle a camera therein and having a port for the lens of a camera;

a pliant member configured to retain a camera in a said compartment biasing the camera in a downwardly angled position and absorbing vibration;

a back plate; and a gasket between the housing and said back plate, the back plate secured to the housing sealing it.

27. A camera pod comprising:

a housing including intersecting ribs defining a plurality of camera compartments configured to downwardly angle a camera therein and having a port for the lens of a camera;

a pliant member configured to retain a camera in a said compartment biasing the camera in a downwardly angled position and absorbing vibration;

a back plate secured to the housing sealing it; and a doubler secured to the back plate.

\* \* \* \* \*